Oct. 25, 1932.    S. J. LLOYD ET AL    1,884,762
PROCESS OF PRODUCING SULPHUR DYES
Filed March 8, 1929
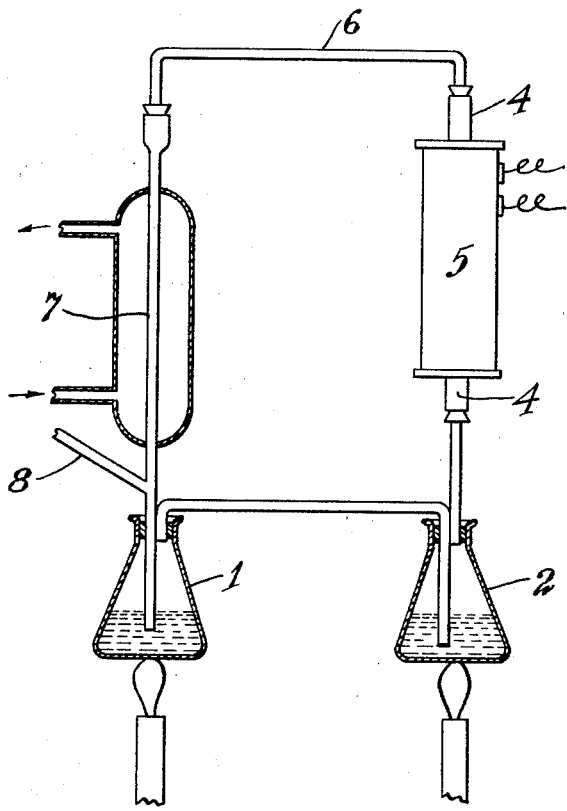
Inventor
S. J. Lloyd
G. D. Palmer Jr.
By Johnston & Jennings Attorneys Patented Oct. 25, 1932

1,884,762

UNITED STATES PATENT OFFICE

STEWART J. LLOYD AND GEORGE D. PALMER, JR., OF UNIVERSITY, ALABAMA, ASSIGNORS OF ONE-THIRD TO ABSALOM M. KENNEDY, OF UNIVERSITY, ALABAMA

PROCESS OF PRODUCING SULPHUR DYES

Application filed March 8, 1929. Serial No. 345,340.

This invention relates to the production of dyestuffs, particularly to that class known as sulphur or sulphide dyes and has for its object the production of dyestuffs similar to these in a new and novel manner which is, at the same time, simple and economical.

Another object is the production of new dyestuffs.

A further object is the production of these dyestuffs from raw materials which have, heretofore, not been used for this purpose.

A still further object is the production of dyestuffs of this character, the color from which is formed directly in the bath and is not materially changed by subsequent exposure of the moist fabric to the atmosphere.

The sulphur or sulphide dyes, as heretofore known, are produced by heating many organic substances with sulphur or with alkali metal sulphides, such as sodium sulphide ($Na_2S$), or with both. The product, freed from unchanged sulphur, as by removing the latter with carbon bisulphide, is insoluble in water and in most of the usual solvents such as alcohol, ether, chloroform, etc., but is soluble in a solution of alkali metal sulphide, forming a dye which, on fabrics, particularly on cotton or linen, is generally fast to washing, to acids, alkalies and the ordinary solvents, and to light. These dyes are generally, when in a moist condition, rapidly oxidized by the air with a change of color which, after such oxidation, is permanent.

An example of this class of dyestuffs, using the original "cachou de Laval" for illustration, is given by Charles E. Pellew in "Dyes and Dyeing", 1918 edition, page 85, as follows:

"This dyestuff was made by heating sawdust, bran, turf, leaves or other vegetable substances with the strongly reducing alkaline salt, sodium sulphide, in the absence of air. The product, dissolved in water, makes a dark green solution which, after standing in the air a short time, turns brown and deposits a fine, brownish powder. Cotton or linen, heated in a fresh solution of this dyestuff, is colored green, but, when wrung out and exposed to the air, the green color, which easily washes out, changes to a very permanent, though dull and uninteresting shade of greyish brown".

To obtain more uniform products, the later dyestuffs are made from organic substances having a definite chemical composition which are heated with sulphur or an alkali metal sulphide or with both. In this manner black, blue, green, brown, yellow and reddish dyestuffs are obtained of which the original vidal black, produced by heating either p-aminophenol, or substances capable of yielding this compound, with alkali metal polysulphides, is an example.

In the production of these dyestuffs, the original material and sulphur, or an alkali metal sulphide or both, have heretofore, been heated together in the solid or liquid phase at atmospheric or at higher pressures.

We have found that when numerous organic substances including methane, benzene, toluene, diphenyl, naphthalene, anthracene, aniline, phenol, monochlorbenzene, turpentine, kerosene, furfural, acetic acid, natural gas and coal gas, are sent, in the vapor phase, through or over sulphur, an alkali metal sulphide, or both, heated to a temperature above that to which these materials have previously been heated for the preparation of sulphide dyes, that is above 300° C., dyestuffs are produced in the sulphur or in the sulphur mixture, and which may be separated from the residual sulphur by removing the latter with some solvent, such as carbon bisulphide.

The dyestuff thus formed is insoluble in ordinary solvents such as water, alcohol, ether, benzene, carbon bisulphide, chloroform, etc., but may be dissolved in a solution of alkali metal sulphide from which solution it is precipitated on the addition of an acid, such as hydrochloric or acetic.

When the vapors of the organic substances are sent through or over sulphur heated as above described, some of the colors, which these dyestuffs produce on cotton are:

With benzene, a reddish brown.
With toluene, a dark, olive drab.
With aniline, a gray-green.
With turpentine, a yellow-brown.
With furfural, a dark, warm brown.
With kerosene, a brown.
With acetic acid, a tan.

We have found that these colors are reproduceable; that is, the same organic compound produces the same color when heated in the vapor phase with sulphur in the manner described, and that reasonable variations in the temperature of the sulphur do not affect this color materially.

These colors, on cotton, are fast to repeated washing with soap and water, to acids and alkalies, to sunlight, and to solvents such as alcohol, ether, benzene, carbon bisulphide, chloroform, etc.

In most of their characteristics, these dyestuffs resemble the well known sulphide dyestuffs. With many of the sulphide dyes, however, the fabric changes color after being removed from the bath from atmospheric oxidation. This is shown for "cachou de Laval", quoted above.

Fabrics dyed with the dyestuffs made as herein described, do not materially change color on being withdrawn from the bath but retain, permanently, the same color as was given them in the dye bath. This fact is of considerable advantage to the dyer in attempting to match colors or shades.

We have found that the temperature to which the sulphur is heated is an important factor in the production of these dyestuffs and that this temperature must be above the fusion point of the sulphur and above the boiling point or the temperature at which the organic material is changed into a vapor. For example, when phenol is heated with sulphur, in the presence of an alkaline catalyst, to 135–160° C., a resin is formed, as shown by Ellis in U. S. Patent No. 1,690,160 of November 6, 1928. We have found that when phenol is sent, in the vapor phase, through sulphur heated above the boiling point of phenol (about 185° C.), and preferably above 300° C., at which temperature the phenol is maintained in the vapor phase, a dark brown dyestuff is produced.

We have found, further, that while dyestuffs are produced by the reaction between organic materials in the vapor phase and sulphur heated to above the boiling point of the organic substance, in the case of substances having low boiling points, this reaction is very slow. We prefer to heat the sulphur to a higher temperature to secure a more rapid reaction and have found that, with most organic materials, the reaction proceeds rapidly and satisfactorily above 300° C. For example, in producing an olive drab dyestuff from toluene, we have secured very satisfactory results by sending the vapor of toluene through sulphur heated to 360–400° C.

We are aware that sulphide dyestuffs have heretofore been produced with the hydrocarbons acenaphthene and retene and that dyestuffs not soluble in a solution of sodium sulphide have been made from anthracene and sulphur. So far as we are aware however, the process we employ is new and also the use of the simpler hydrocarbons and their simple derivatives in the production of sulphide dyes is new. For example, we have found that methane, benzene, toulene, phenol, diphenyl, kerosene, acetic acid, furfural, naphthalene, chlorbenzene, etc., may be successfully used for this purpose.

To prepare these dyestuffs, we prefer to proceed as follows, referring to the accompanying drawing:

The organic material is placed in a vessel, such as a flask 1, and is heated to its boiling point or to a temperature at which the material is vaporized and the vapor is passed through the tube, as shown, into a vessel 2 containing sulphur heated to above its fusing point and above the boiling point of the organic material, and preferably to 300° C., or more. Preferably, the vapors are so introduced as to bubble upwards through the molten sulphur, thereby insuring their intimate contact therewith and hastening the reaction. In this vessel 2 the organic vapor combines with the sulphur to form the dyestuff.

Uncombined vapors of the organic compound and gaseous products of the reaction pass through the tube shown into the tube 4 which is adapted to be heated, as by an electric furnace 5, and from this are carried by means of the tube 6 into a condenser 7 where that portion of the gases which forms liquids or solids at the temperature of the condenser is returned to the flask 1 while that part which remains gaseous at this temperature, escapes through the opening 8 and may be collected, if desired.

It will be noted that any part of the organic compound not acted on by the heated sulphur in 2 is returned to 1 for reuse and is thus recirculated through the system until acted on by the sulphur and converted into a dyestuff.

When the organic material is a gas as natural gas, or illuminating gas, the flask 1, of course, will not be necessary, and suitable collection means for the uncombined gas must be provided. In the reaction between the organic material and the sulphur, a considerable quantity of hydrogen sulphide ($H_2S$) is produced.

With organic compounds having a comparatively low boiling point, such as benzene, toluene, turpentine, etc., the tube 4 and the furnace 5 are not necessary. For solids, such as anthracene, naphthalene, etc., having comparatively high boiling points, the furnace prevents the condensation of these solids in and the stopping of the connecting tubes.

On the completion of the reaction, the material in flask 2 is removed and pulverized and this pulverized mass is washed with carbon bisulphide or some other solvent for sulphur until practically all of the free sulphur is removed.

The residue from this washing may be dissolved in a solution of sodium sulphide and this solution used as a dye bath as sulphur dyes are usually used or the residue may be dissolved in a solution of sodium sulphide and precipitated with hydrochloric or with acetic acid and the precipitate then dissolved in a solution of sodium sulphide to form a dye bath.

Clearer colors and shades are produced from the purified or precipitated dyestuffs.

The sulphur content of the hydrogen sulphide gas produced in the reaction between the organic material vapor and the heated sulphur and that contained in the solvent used in removing the sulphur from the dyestuff may be recovered by well known methods for reuse.

It is obvious that by providing apparatus adapted for the continuous feed of raw material into flask 1 and the continuous removal of the product from flask 2, the continuous production of dyestuffs by the method herein described may be accomplished.

What we claim is:

1. A process for producing dyestuffs comprising passing the vapors of a volatile organic compound containing hydrogen through molten sulphur.

2. A process for producing dyestuffs which comprises bringing a stream of vapor of a volatile organic compound containing hydrogen into contact with molten sulphur, and collecting the product of this reaction.

3. A process for producing dyestuffs which comprises bringing a stream of the vapor of a volatile organic compound containing hydrogen into contact with molten sulphur, removing the uncombined product of this reaction by means of a solvent, and collecting the residue.

4. A process for producing dyestuffs which comprises bringing a stream of the vapor of a volatile organic compound containing hydrogen into contact with sulphur heated to 300° to 400° C.

5. A process for producing sulphur dyes which comprises bubbling vapors of a volatile organic compound containing hydrogen through molten sulphur.

6. A process for producing sulphur dyes which comprises bubbling vapors of a volatile organic compound containing hydrogen through molten sulphur, the sulphur being heated to a temperature of from 300° to 400° C.

7. A process for producing sulphur dyes which comprises bubbling vapors of a volatile organic compound containing hydrogen through molten sulphur, the sulphur being heated to a temperature of approximately 300° C. and collecting unreacted vapors for repassing through the molten sulphur.

8. A process for making sulphur-organic compounds which consists in bringing a stream of the vapor of a volatile organic compound containing hydrogen into contact with molten sulphur.

In testimony whereof we affix our signatures.

STEWART J. LLOYD.
GEORGE D. PALMER, Jr.